(12) United States Patent
Murrell

(10) Patent No.: US 9,840,899 B2
(45) Date of Patent: Dec. 12, 2017

(54) THREE-PHASE METHOD FOR INJECTING CARBON DIOXIDE INTO OIL RESERVOIRS

(71) Applicant: GENERAL ELECTRIC COMPANY, Schenectady, NY (US)

(72) Inventor: Glen Richard Murrell, Oklahoma City, OK (US)

(73) Assignee: General Electric Company, Niskayuna, NY (US)

(*) Notice: Subject to any disclaimer, the term of this patent is extended or adjusted under 35 U.S.C. 154(b) by 64 days.

(21) Appl. No.: 14/574,127

(22) Filed: Dec. 17, 2014

(65) Prior Publication Data

US 2016/0102538 A1    Apr. 14, 2016

Related U.S. Application Data

(60) Provisional application No. 62/061,192, filed on Oct. 8, 2014.

(51) Int. Cl.
| | |
|---|---|
| *E21B 43/26* | (2006.01) |
| *C09K 8/594* | (2006.01) |
| *C09K 8/62* | (2006.01) |
| *E21B 41/00* | (2006.01) |
| *E21B 43/16* | (2006.01) |
| *C09K 8/92* | (2006.01) |

(52) U.S. Cl.
CPC .............. *E21B 43/26* (2013.01); *C09K 8/594* (2013.01); *C09K 8/62* (2013.01); *C09K 8/92* (2013.01); *E21B 41/00* (2013.01); *E21B 43/164* (2013.01); *Y02C 10/14* (2013.01); *Y02P 90/70* (2015.11)

(58) Field of Classification Search
USPC ........................................................ 166/402
See application file for complete search history.

(56) References Cited

U.S. PATENT DOCUMENTS 3,065,790 A * 11/1962 Holm .................... E21B 43/164
                                                    166/402
4,509,596 A *  4/1985 Emery ................... E21B 43/18
                                                    166/268

(Continued)

OTHER PUBLICATIONS

Shoaib et al., "CO2 Flooding the Elm Coulee Field", SPE Rocky Mountain Petroleum Technology Conference, Colorado, USA, pp. 1-11, Apr. 14-16, 2009.

(Continued)

*Primary Examiner* — Angela M DiTrani
(74) *Attorney, Agent, or Firm* — Pabitra K. Chakrabarti

(57) ABSTRACT

A method includes a first injection phase that includes injecting a first gas-based fluid into a subterranean formation at a first pressure that exceeds a fracture pressure of the subterranean formation. The method also includes a second injection phase that includes injecting a second gas-based fracturing fluid into the subterranean formation at a second pressure that exceeds a minimum miscibility pressure of the second gas-based fluid, followed by a shut in period. The method further includes a third injection phase that includes injecting the first gas-based fluid or a third gas-based fluid into the subterranean formation at the first fracture pressure or at a third pressure exceeding the fracture pressure of the subterranean formation. The first gas-based fluid, second gas-based fluid, and third gas-based fluid include carbon dioxide ($CO_2$).

18 Claims, 7 Drawing Sheets

(56) References Cited

U.S. PATENT DOCUMENTS

| | | | | |
|---|---|---|---|---|
| 4,605,066 | A | * | 8/1986 | Djabbarah .............. E21B 43/18 |
| | | | | 166/403 |
| 4,825,952 | A | | 5/1989 | Mzik |
| 4,903,768 | A | | 2/1990 | Shu |
| 5,472,050 | A | | 12/1995 | Rhoten et al. |
| 5,883,053 | A | | 3/1999 | Tudor |
| 6,095,244 | A | | 8/2000 | Graham et al. |
| 7,730,958 | B2 | | 6/2010 | Smith |
| 8,091,625 | B2 | | 1/2012 | Ware et al. |
| 8,146,666 | B2 | | 4/2012 | Tang |
| 2014/0251626 | A1 | * | 9/2014 | Gomaa .................... C09K 8/62 |
| | | | | 166/308.5 |

OTHER PUBLICATIONS

Vincent, "Refracs: Why Do They Work, and Why Do They Fail in 100 Published Field Studies?", SPE Annual Technical Conference and Exhibition, Florence, Italy, pp. 1-26, 2010.

Wang et al., "Assessment of CO2 Flooding Potential for Bakken Formation, Saskatchewan", Canadian Unconventional Resources and International Petroleum Conference, Alberta, Canada, pp. 1-14, Oct. 19-21, 2010.

Gamadi et al., "An Experimental Study of Cyclic CO2 Injection to Improve Shale Oil Recovery", SPE Improved Oil Recovery Symposium, Oklahoma, USA, pp. 1-11, Apr. 12-16, 2014.

Yu et al., "Simulation Study of CO2 Huff-n-Puff Process in Bakken Tight Oil Reservoirs", SPE Western North American and Rocky Mountain Joint Meeting, Colorado, USA, pp. 1-16, Apr. 16-18, 2014.

PCT Search Report and Written Opinion issued in connection with corresponding Application No. PCT/US2015/050313 dated Dec. 16, 2015.

Wan, Tao, Evaluation of the EOR Potential in Shale Oil Reservoirs by Cyclic Gas Injection, A THESIS, May 2013, pp. 1-153, https://repositories.tdl.org/ttu-ir/handle/2346/48967.

Gupta, D.V. Satya, Unconventional Fracturing Fluids: What, Where and Why, Tomball Technology Center, 2010, pp. 1-45.

* cited by examiner

THREE-PHASE METHOD FOR INJECTING CARBON DIOXIDE INTO OIL RESERVOIRS

CROSS REFERENCE TO RELATED APPLICATIONS

This application claims priority from and the benefit of U.S. Provisional Application Ser. No. 62/061,192, entitled "Method of Increasing Oil Production," filed Oct. 8, 2014, which is hereby incorporated by reference.

BACKGROUND

The subject matter disclosed herein relates to the recovery of hydrocarbons. Specifically, the present approaches relate to hydraulic fracturing techniques and Enhanced Oil Recovery.

Hydrocarbon fluids (e.g., oil and gas) are found in subterranean formations beneath the Earth's surface. To obtain these fluids, well bores are drilled into the formations through which the fluid is brought to the surface. Productivity of a formation thus depends on the oil's ability to reach the well bore, which may be governed by formation permeability. Production rates from these formations are often less than expected or desired due to a variety of factors. One common factor for lower production rates is the restricted flow of oil through the porous media of the subterranean formation. Production is reduced when the permeability of the formation is low because oil flow to the production well is restricted.

Hydraulic fracturing ("fracturing" or "fracing") is a process commonly used to increase the flow of desired fluids, such as oil and gas, from a subterranean formation. Hydraulic fracturing involves introducing a fracturing fluid into a subterranean formation at or above a pressure sufficient to create or enhance one or more fractures in the formation to facilitate the oil's ability to flow from the formation reservoir to the well bore. Enhancing a fracture means enlarging a pre-existing fracture in the formation, which leads to increased permeability of the subterranean formation.

After a fracturing fluid has been used to form fractures in a subterranean formation, it is usually returned to the surface. It is desirable to recycle the fracturing fluid so it may be used to form additional fractures in the same subterranean formation via another well, or to form fractures in one or more different subterranean formations penetrated by the same well, while minimizing waste. However, conventional fracturing fluids, such as water, are not optimal for recycling as a result of the high operating costs and necessary supplemental equipment. Additionally, using water or another liquid can be detrimental to the formation, and thus oil production, because liquids can lead to phase trapping and clay swelling. Therefore, a need exists for a fracturing fluid that can be easily recycled and that can mitigate any damage to the subterranean formation.

BRIEF DESCRIPTION

In one embodiment, a method for stimulating a subterranean formation is described. A first injection phase includes injecting a first gas-based fluid into a subterranean formation at a first pressure that exceeds a fracture pressure of the subterranean formation, wherein the first gas-based fluid has at least 65% carbon dioxide ($CO_2$) by weight. Next, a second injection phase includes injecting a second gas-based fluid into the subterranean formation at a second pressure that exceeds a minimum miscibility pressure of the second gas-based fluid followed by a shut in period, wherein the second gas-based fluid has at least 65% carbon dioxide ($CO_2$) by weight. Finally, a third injection phase includes injecting the first gas-based fluid or a third gas-based fluid into the subterranean formation at the first pressure exceeding the fracture pressure of the subterranean formation or at a third pressure exceeding the fracture pressure of the subterranean formation, wherein the third gas-based fluid has at least 65% carbon dioxide ($CO_2$) by weight.

In another embodiment, a method for stimulating a subterranean formation is described. A first injection phase follows a re-stimulation of the subterranean formation and includes two or more cyclical injections of a first gas-based fluid into the subterranean formation at a first pressure that exceeds a minimum miscibility pressure of the first gas-based fluid followed by a shut in period, wherein the first gas-based fluid has at least 65% carbon dioxide ($CO_2$) by weight. Following the first injection phase, the method includes a second injection phase after a final repetition of the first injection phase, and the second injection phase includes injecting a second gas-based fluid into the subterranean formation at a second pressure exceeding a fracture pressure of the subterranean formation, wherein the second gas-based fluid has at least 65% carbon dioxide ($CO_2$) by weight.

In another embodiment, a method for stimulating a low permeability subterranean formation is disclosed. A first injection phase includes injecting a first gas-based fluid into a low permeability subterranean formation at a first pressure that exceeds a fracture pressure of the low permeability subterranean formation. The low permeability subterranean formation possesses a permeability of less than 100 millidarcies, and the first gas-based fluid has at least 65% carbon dioxide ($CO_2$) by weight. Next, a second injection phase includes two or more cyclical injections of a second gas-based fluid into the low permeability subterranean formation at a second pressure that exceeds a minimum miscibility pressure of the second gas-based fluid followed by a shut in period. The second gas-based fluid has at least 65% carbon dioxide ($CO_2$) by weight. Finally, a third injection phase occurs after a final repetition of the second injection phase, and includes injecting the first gas-based fluid or a third gas-based fluid into the low permeability subterranean formation at the first pressure exceeding the fracture pressure of the low permeability subterranean formation or at a third pressure that exceeds the fracture pressure of the low permeability subterranean formation. The third gas-based fluid has at least 65% carbon dioxide ($CO_2$) by weight.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
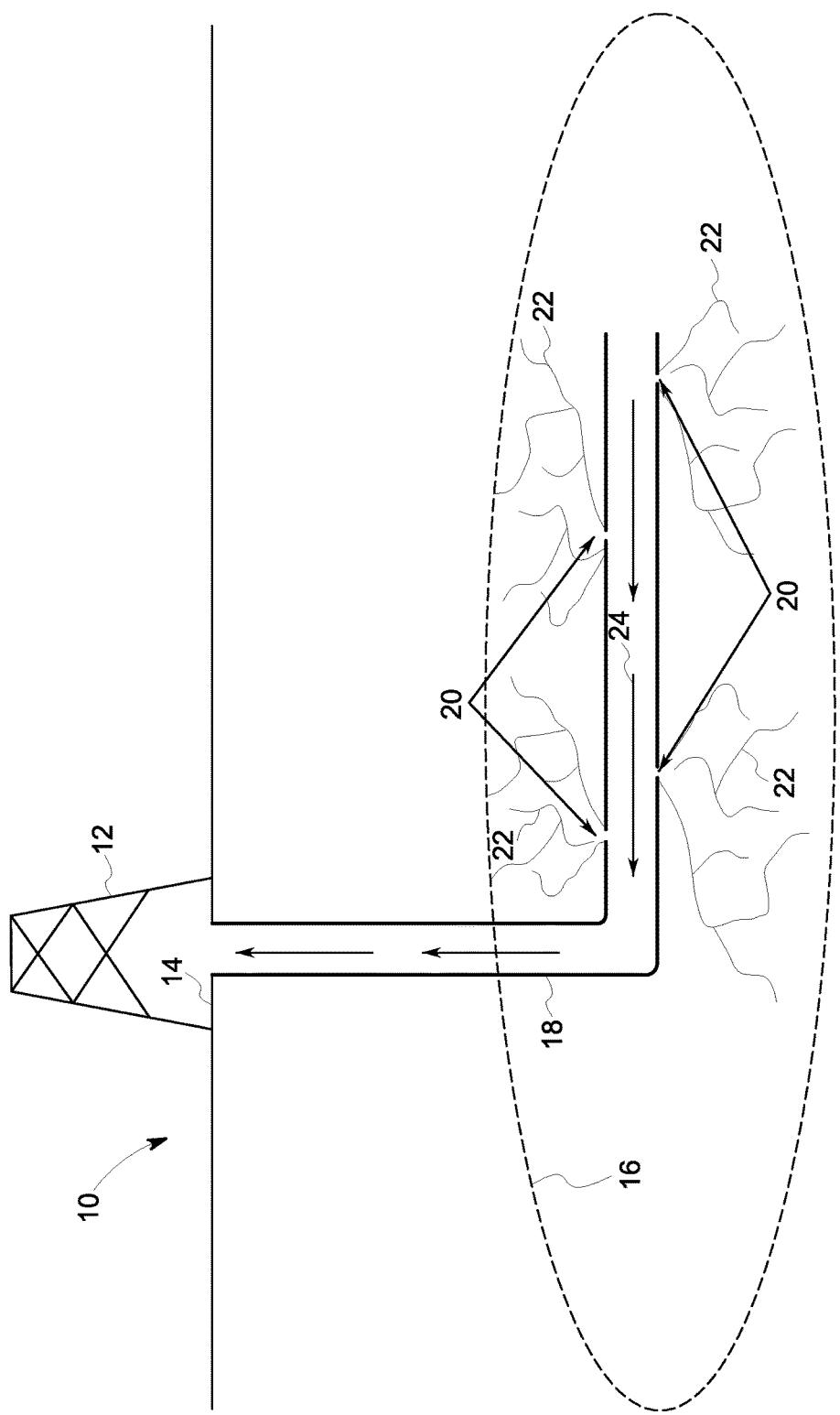
FIG. 1 illustrates a traditional fracturing operation in a laterally drilled oil well.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As oil reserves continue to deplete across the globe, the resource is becoming increasingly valuable and more difficult to obtain. Oil is found below the Earth's surface where it is trapped in reservoirs between layers of rock that prohibit flow. In order to recover the oil, a well is drilled to create a passage between the oil reservoir and the surface where oil is to be collected. At the early stages of the well, the pressure in the reservoir can greatly exceed the pressure on the surface, such that oil flows naturally from the reservoir to the surface. However, the reservoir pressure tends to decrease rapidly which greatly limits how much oil can be recovered. Additionally, oil flow is restricted by the permeability of the rock that forms the reservoir. A low permeability limits the amount of flow even when there is still a significant pressure difference between the reservoir and the surface.

Several techniques have been implemented in order to increase the flow of oil upon a decrease of formation pressure and/or a formation with low permeability. Two such examples include hydraulic fracturing and lateral drilling, which can be performed separately or in conjunction with one another. First, hydraulic fracturing is a process whereby a fluid is injected into the oil reservoir at a high rate and pressure to fracture, or enhance existing fractures, in the rock formation to facilitate the flow of oil through the rock. Some variables that are considered when undergoing a fracturing operation include: reservoir pressure, reservoir temperature, the geologic nature of the reservoir, the formation rock properties, the properties of the fluids being produced, and the properties of the fracturing fluid. Fracturing may be achieved by pressurization with a gas, pressurization with a liquid, or pressurization with a slurry comprising a fracturing fluid and proppants. Proppants are small, solid particulates that enter the formation fractures to prevent such fractures from closing upon a release of pressure. Proppants may be used in either a gas-based fracturing fluid or a water-based fracturing fluid.

A variety of equipment is used in the fracturing process. For example, fracturing fluid blenders, fracturing units having high volume and high pressure pumps, fracturing tanks, and so forth may be used in a fracturing operation. When using a gas-based fluid as the fracturing fluid, one or more compressors may also be necessary. Additionally, a fracturing tree is generally coupled between the wellhead of a well and the fracturing unit. The fracturing tree has a variety of valves to control the flow of fracturing fluid and production fluid through the fracturing tree.

Typically, the fluid utilized in hydraulic fracturing is water, but water can cause damage to the rock formation through phase trapping and clay swelling. Phase trapping occurs when the fracturing fluid is immiscible within the porous media of the formation, and when the porous media is already partially saturated with the fracturing fluid (e.g., water). Introduction of additional immiscible fluid (e.g., water) increases the existing water saturation level causing a reduction in the relative permeability to oil, thereby obstructing the flow of oil to the well bore. Utilizing water as a fracturing fluid enhances the probability that phase trapping will occur when water is known to be present in the formation because the formation is more likely to incur saturation. Therefore, using a fracturing fluid that is less likely to trap is desirable.

Clay swelling is the result of clay particles within the rock formation absorbing the water or other fracturing fluid and, as a result, expanding. Expansion of the clay particles reduces permeability by blocking pore throats within the porous media, or blocking the natural or induced fractures within the formation. Therefore, use of a fracturing fluid that will not lead to expansion of any portion of the rock formation can mitigate this issue.

Instead of using a water-based fluid as the substance for creating fractures in the low-permeability subterranean formation, an operator may inject a gas-based fluid instead. Use of a gas-based fluid, as opposed to a water-based fluid, could reduce the effects of both phase trapping and clay swelling. Additionally, a gas-based fluid may be more suitable for recycling than a water-based fluid and could thereby reduce operating costs.

Utilizing a gas-based fracturing fluid as opposed to a water-based fracturing fluid can alleviate the issues associated with phase trapping and clay swelling. A gas-based fracturing fluid such as carbon dioxide ($CO_2$), nitrogen ($N_2$), carbon monoxide (CO), methane ($CH_4$), argon (Ar), helium (He), neon (Ne), krypton (Kr), xenon (Xe), radon (Rn), or any combination thereof, would be unlikely to cause phase trapping because these fluids undergo a phase change into gaseous form when pressure is released from the formation, thereby flowing to the well bore without any substantial obstruction. Additionally, the formation clays are not likely to swell upon absorption of any of these gas-based fracturing fluids. Therefore, a gas-based fracturing fluid can decrease the potential for damage to the reservoir that water or other water-based fracturing fluids may create.

Second, lateral drilling can be performed to increase oil production in a well that has reduced reservoir pressure or low permeability. Lateral drilling is when the well bore is drilled in a horizontal direction as opposed to the traditional, vertical direction. Lateral drilling is especially useful when the oil reservoir is thin and the permeability low, because it increases the contact length of the oil well to the productive zone. This procedure allows more oil to come into contact with the well bore than a vertical well, such that production may increase.

Hydraulic fracturing and lateral drilling, together or separate, increase oil recovery, however, the production life of the well is relatively short and a maximum of only about 10% of the total oil in an unconventional tight oil reservoir is typically recovered. Therefore, an alternate process is desired that can achieve greater total production of the reservoir. Such a process is valuable because of the increasing scarcity of oil. A method is taught herein that injects gas-based fluids into a low-permeability subterranean formation in three different phases to maximize oil recovery.

Turning to the figures, FIG. 1 represents a traditional hydraulic fracturing and lateral drilling operation for enhanced oil recovery 10. The drilling rig 12 creates a well 14 that penetrates into an oil reservoir 16. The well begins in a vertical direction and then at a depth 18 of the oil reservoir, the well is drilled laterally to increase the contact surface area between the well bore and the existing oil. Drilling laterally allows more of the well bore to contact the reservoir, enabling more oil to enter the well bore, and therefore, more oil production. Fracturing fluid is then sent into the well which has openings 20 that allow the fluid to enter the formation. The fracturing fluid eventually builds up pressure within the formation, which causes formation fractures 22 and increases oil flow 24 to the surface.

Figure 2:
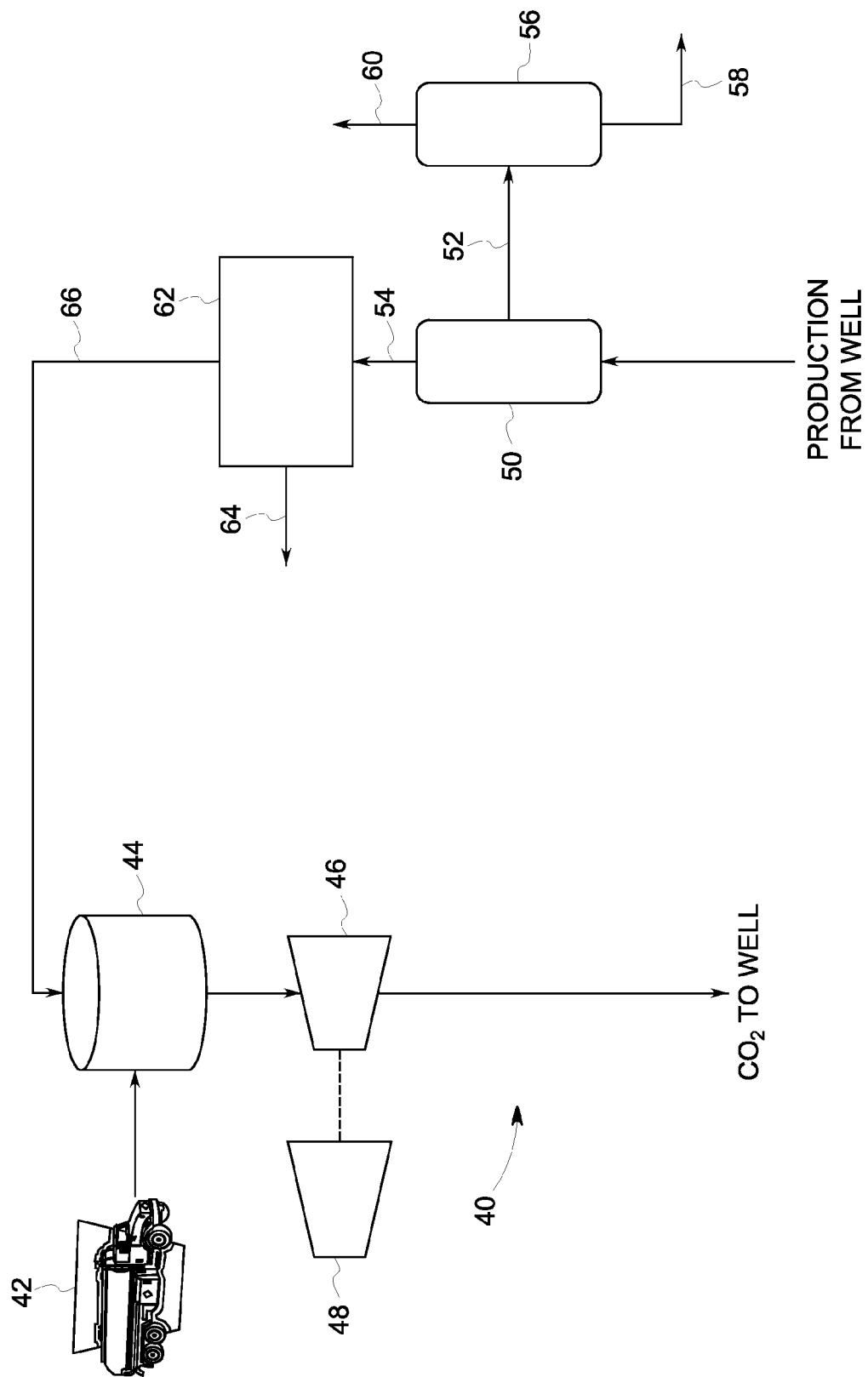
FIG. 2 shows an embodiment of a system that can be installed at the surface of an oil well to implement the methods described herein for enhancing oil recovery.

FIG. 2 shows an embodiment of a system 40 that may be used to inject a gas-based fluid into a well. First, the gas-based fluid may be delivered to the drilling site by way of a truck 42 or other transportation vessel. The gas-based fluid is stored in a tank or vessel 44 where it sits until the well is ready for injection (i.e., the reservoir pressure has significantly decreased or the permeability of the formation is considerably low). The gas-based fluid is removed from the storage vessel 44 and compressed by a compressor 46 powered by a turbine 48. The first compressor 46 brings the gas-based fluid to the appropriate pressure associated with the given injection phase. In certain implementations discussed herein, the first injection phase and third injection phase of the gas-based fluid are above a fracture pressure of the reservoir. The gas-based fluid injected during the first injection phase and the third injection phase may or may not be the same. The second injection phase of a gas-based fluid is at a pressure above a minimum miscibility pressure of the gas-based fluid utilized. The gas-based fluid used during the second phase may be the same or different from the gas-based fluid utilized in the first injection phase and/or the third injection phase. Additionally, the second injection phase pressure is typically less than the pressure required to fracture the formation, and therefore, utilizing only one compressor may be inefficient.

Using a production well, oil and/or gas is brought to the surface. The product from the well may contain both liquids and gases in some instances. Therefore, the product is pumped from the well and fed to a liquid/gas separator. The liquid/gas separator 50 separates liquid 52 from gas 54 in order to obtain the desired products (e.g., oil and/or natural gas). Liquid/gas separation is necessary because both may be present in the product stream that comes immediately from the well. After the liquid gas separator, the liquid stream 52 may enter a liquid separator 56 where oil 58 (and other desired hydrocarbons) may be separated from any water or other contaminants 60. The oil 58 may then be sent for further processing, or it may be sold to a processing company. The water or other contaminants stream 60 may then be disposed of or treated for reuse in the oil recovery process. For example, water may be treated and then used as a water-based fracturing fluid for further enhanced oil recovery operations. Finally, the gas stream 54 may enter undergo further processing using a gas processing sequence 62. When undergoing gas processing, hydrocarbons may be separated from carbon dioxide. The captured, gas-based hydrocarbons (e.g., natural gas and/or natural gas liquids) 64 may then be sent for further processing, or sold to a processing company. The carbon dioxide 66 from the gas processing sequence 62 may be recycled to be used as a gas-based fracturing fluid for further enhanced oil recovery operations.

Figure 3:
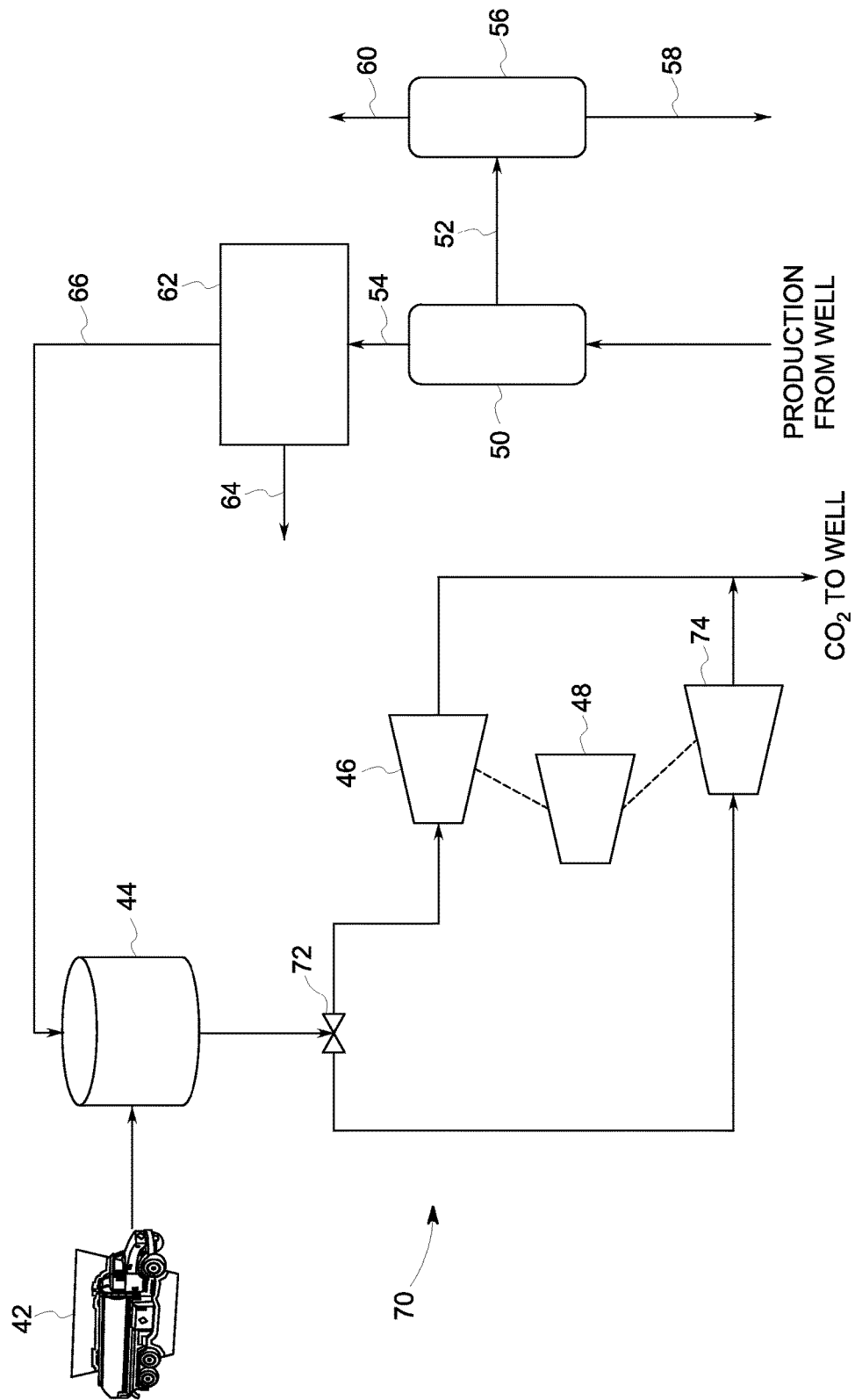
FIG. 3 shows an alternate embodiment of a system that can be installed at the surface of an oil well to implement the methods described herein for enhancing oil recovery.

FIG. 3 shows another embodiment of a system that could be implemented at the surface of an oil well 70. In the alternate embodiment, a valve 72 is added after the storage tank 44 to control the flow of the gas-based fluid to one of at least two compressors. If the method is in the first injection phase or the third injection phase, then the valve may divert the gas-based fluid to the first compressor 46, which may have the ability to compress the gas-based fluid to a higher pressure than a second compressor 74. If the method is in the second injection phase, then the valve may divert the gas-based fluid to the second compressor 74. Since the minimum miscibility pressure of the gas-based fluid is typically considerably less than the fracture pressure of the reservoir, it may be more efficient to include two compressors, where one compressor has the ability to reach much higher pressures than the other compressor. The first compressor 76 may have the ability to reach a pressure of between 3,500 psi and 4,500 psi; 3,000 psi and 5,000 psi; or 2,500 psi and 6,000 psi. The second compressor 74 may only have the ability to reach a maximum of 2,000 psi; 1,800 psi; or 1,500 psi. FIG. 3 shows both the first compressor 46 and the second compressor 74 as being powered by the turbine 60. In an alternate embodiment, the first compressor 46 and the second compressor 74 may be powered by separate turbines.

Figure 4:
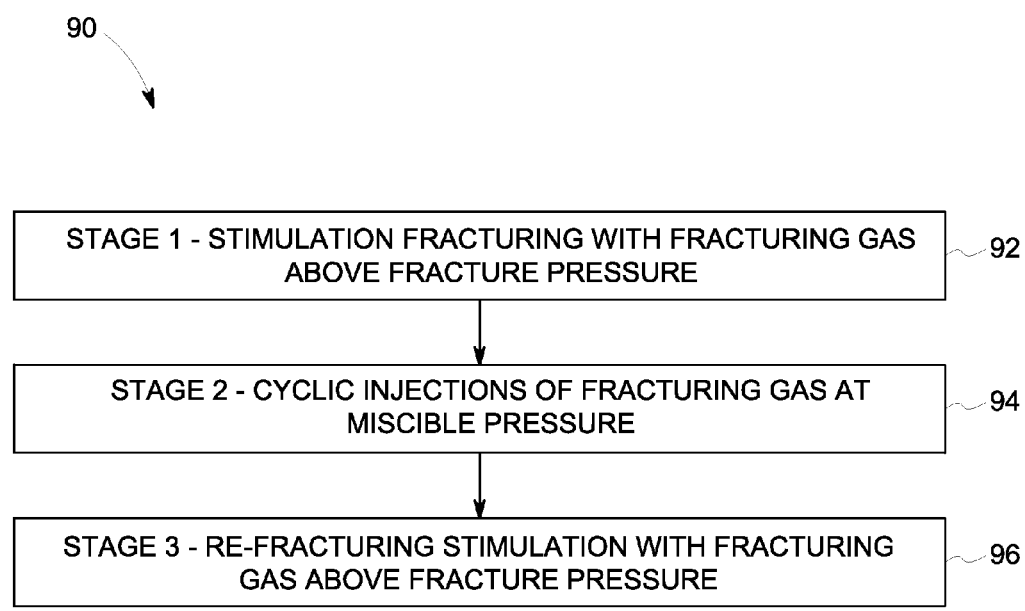
FIG. 4 shows an embodiment of the three-phase method for injecting gas-based fluids into a subterranean formation in accordance with aspects of the present disclosure.

FIG. 4 shows a block diagram that illustrates one embodiment of the invention 90 comprising a three phase method. The first stage 92 involves injecting a first gas-based fluid, such as carbon dioxide ($CO_2$), at a pressure above the reservoir's fracture pressure. The fracture pressure depends on the particular well and is proportionate to the depth of the well. In other words, the greater the depth of the well, the greater the fracture pressure. The fracture pressure can be 3,000 psi or greater; 3,250 psi or greater; or 3,500 psi or greater. The first gas-based fluid is compressed to reach the fracture pressure and then injected into the well in order to fracture the formation and stimulate the flow of oil from the reservoir to the surface. The first gas-based fluid can be any of the following: carbon dioxide ($CO_2$), nitrogen ($N_2$), carbon monoxide (CO), methane ($CH_4$), argon (Ar), helium (He), neon (Ne), krypton (Kr), xenon (Xe), radon (Rn), or any combination thereof. In one embodiment, the first gas-based fluid comprises at least 65% carbon dioxide ($CO_2$). In another embodiment, the first gas-based fluid comprises at least 65% carbon dioxide ($CO_2$). In other embodiments the first gas-based fluid may be over 90% $CO_2$ (e.g., 100% $CO_2$).

In one embodiment, the second stage 94 involves injecting a second gas-based fluid into the well at a minimum miscibility pressure of the second gas-based fluid. The minimum miscibility pressure of the second gas-based fluid is the pressure at which the second gas-based fluid dissolves into the oil in the reservoir. When miscible with the injected gas-based fluid, the oil swells, has lower viscosity and consequently higher relative permeability, and flows easier through the porous media. Therefore, the flow of oil increases. Specifically, at the minimum miscibility pressure, the interfacial tension between the second gas-based fluid and the oil is approximately zero. The minimum miscibility pressure depends on the chemical make-up and other properties of the second gas-based fluid. However, the minimum miscibility pressure can be anywhere from between 100 psi and 3,000 psi; 500 psi and 2,250 psi; or 1,000 psi and 2,000 psi. The injection of the second gas-based fluid at the minimum miscibility pressure is followed by a shut-in period of the well to allow the second gas-based fluid to fully mix with the oil in the reservoir. The second stage 94 can be repeated one or more times following the shut-in period to progressively contact more oil in the fracture volume and porous matrix. The second gas-based fluid can be any of the following: carbon dioxide ($CO_2$), nitrogen ($N_2$), carbon monoxide (CO), methane ($CH_4$), argon (Ar), helium (He), neon (Ne), krypton (Kr), xenon (Xe), radon (Rn), or any combination thereof. In one embodiment, the second gas-based fluid comprises at least 65% carbon dioxide ($CO_2$). In another embodiment, the second gas-based fluid comprises at least 80% carbon dioxide ($CO_2$).

In one embodiment, the third stage 96 involves re-stimulation of the well. The first gas-based fluid or a third gas-based fluid is injected into the well at the fracture pressure of the well or any pressure above the fracture pressure of the well. The re-stimulation stage is performed to target those areas of the well that were unproductive or were not fully fractured after the first stage 92. Re-stimulation increases the life of the well and increases the amount of recovery from the reservoir or formation. The first or third gas-based fluid can be any of the following: carbon dioxide ($CO_2$), nitrogen ($N_2$), carbon monoxide (CO), methane ($CH_4$), argon (Ar), helium (He), neon (Ne), krypton (Kr), xenon (Xe), radon (Rn), or any combination thereof. In one embodiment, the third gas-based fluid comprises at least 65% carbon dioxide ($CO_2$). In another embodiment, the third gas-based fluid comprises at least 65% carbon dioxide ($CO_2$). In other embodiments the third gas-based fluid may be over 90% $CO_2$ (e.g., 100% $CO_2$). In other embodiments, the fracturing fluid of the first phase and/or the third phase may include a portion of water-based fluid rather than be purely a gas-based fluid.

Figure 5:
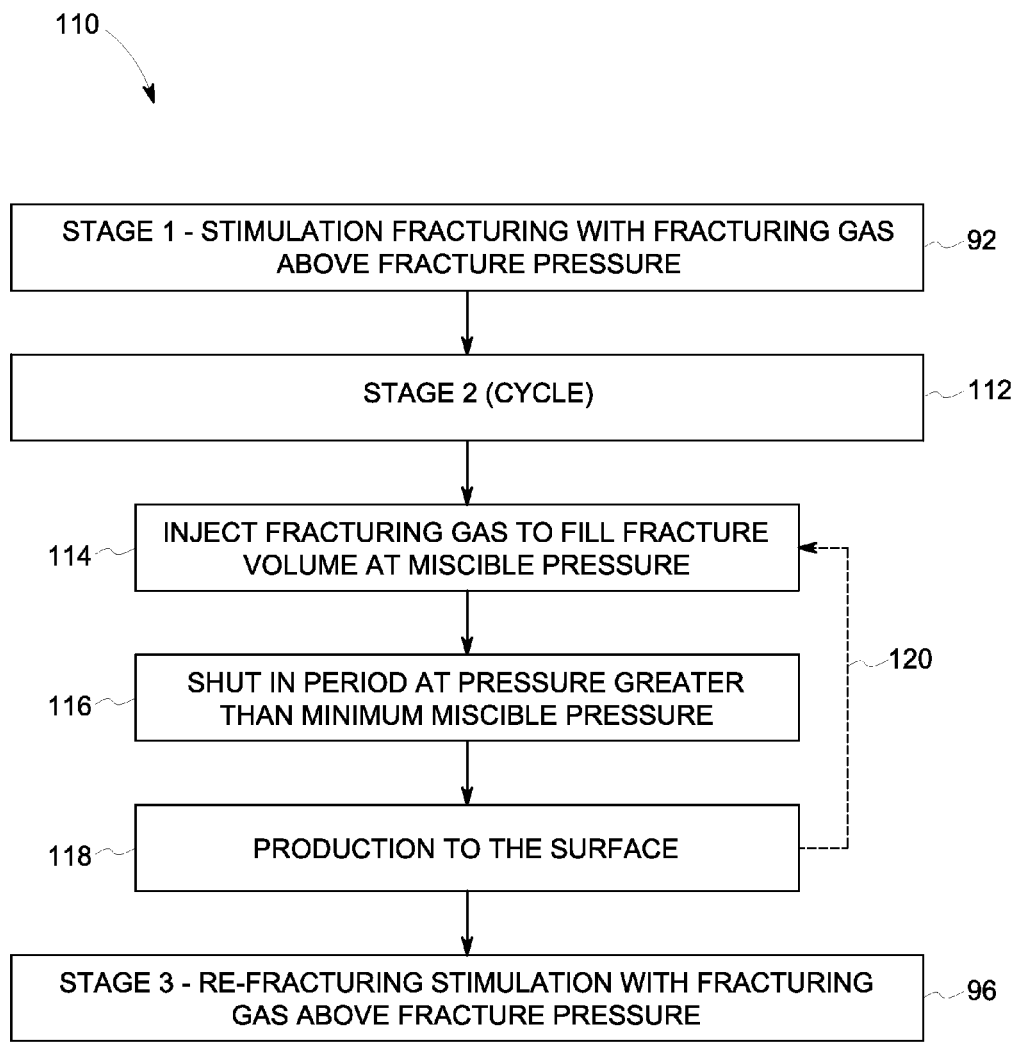
FIG. 5 shows an embodiment of the three-phase method for injecting gas-based fluids into a subterranean formation, and further shows the second phase as a cycle in accordance with aspects of the present disclosure.

FIG. 5 shows an embodiment of the invention 110, wherein the second injection phase 112 is a cycle that can be repeated at least one time. The first step 114 of the second injection phase 112 involves injecting a second gas-based fluid into the well to fill the fracture volume entirely at the minimum miscibility pressure of the second gas-based fluid. At this pressure, the oil's concentration of the second gas-based fluid increases and the oil becomes less viscous, and therefore, flow increases. Specifically, at the minimum miscibility pressure, the interfacial tension between the second gas-based fluid and the oil is zero. The minimum miscibility pressure depends on the chemical make-up as well as other properties of the second gas-based fluid utilized. However, the minimum miscibility pressure can be anywhere from between 100 psi and 2,500 psi; 500 psi and 2,250 psi; or 1,000 psi and 2,000 psi. The second step 116 consists of shutting in the well when the pressure of the second gas-based fluid in the well is greater than the minimum miscibility pressure. Finally, the third step 118 of the second injection phase 112 involves re-opening the well and producing the oil to the surface. The three steps 114, 116, 118 of the second injection phase 112 can be repeated 120 at least one time to increase oil recovery in the well. In an alternate embodiment, the second injection phase may not be repeated. As shown in FIG. 5, after the final repetition of the second stage 112, the third stage 96, as described above, is performed.

Figure 6:
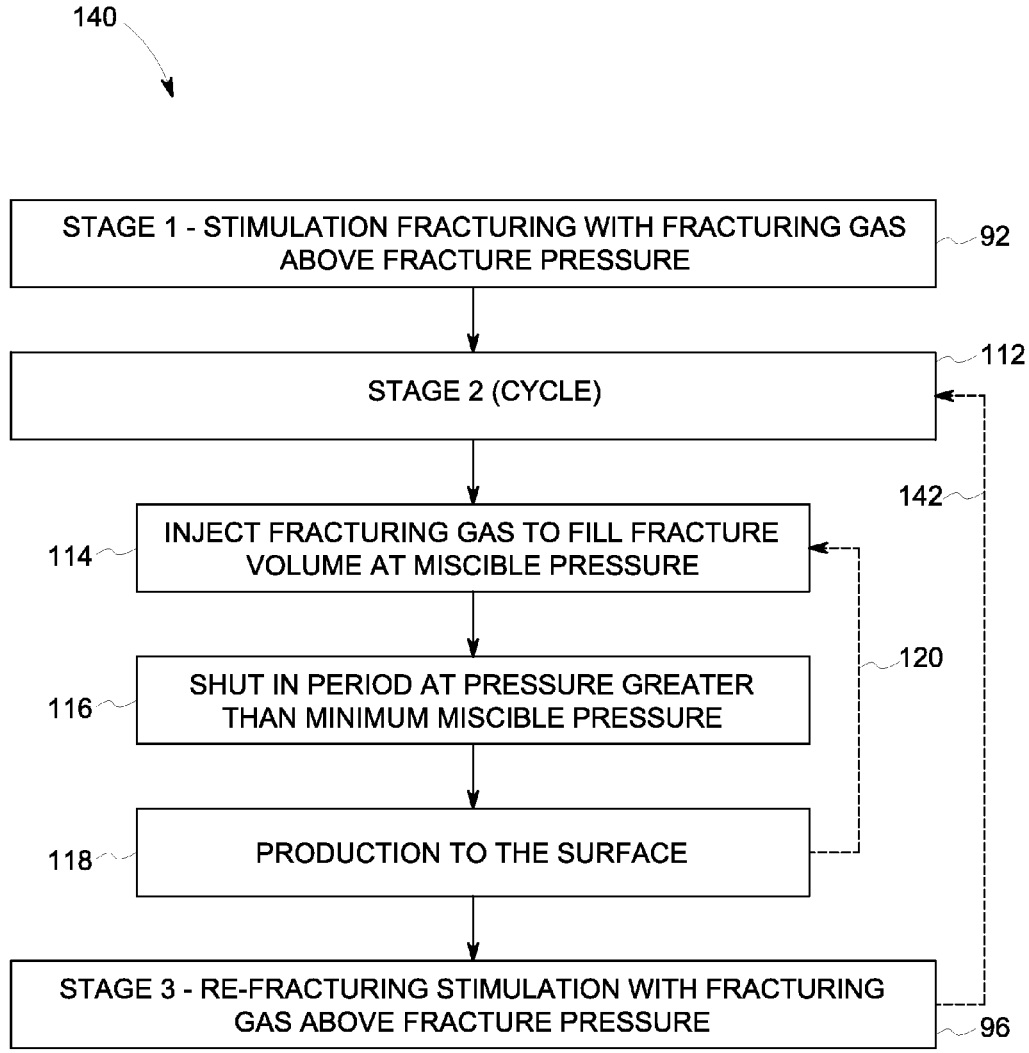
FIG. 6 shows an embodiment of the three-phase method for injecting gas-based fluids into a subterranean formation, wherein the second and third phases can be repeated as a cycle in accordance with aspects of the present disclosure.

FIG. 6 shows another embodiment 140, wherein after completion of the third stage 96, the second stage 112 and third stage 96 can be repeated 142 until oil recovery from the particular formation is terminated.

Figure 7:
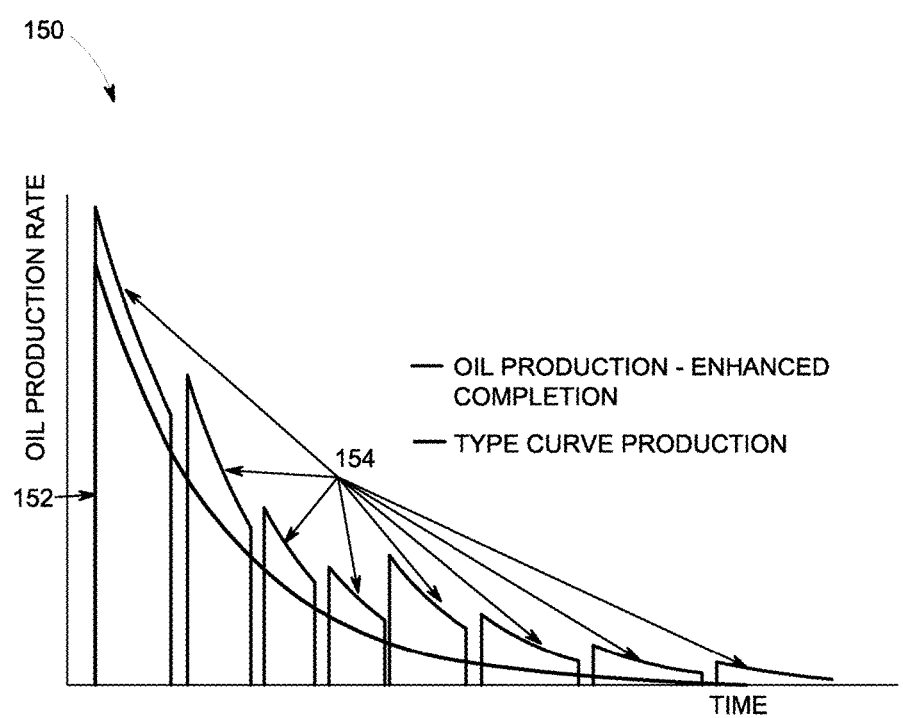
FIG. 7 shows potential enhanced production rates when utilizing an embodiment of the present disclosure when compared to traditional techniques for recovering oil.

FIG. 7 illustrates (graph 150) potential recovery rates that may be achieved while utilizing an embodiment of the present disclosure. The continuous curve 152 illustrates the recovery from low-permeability subterranean formations using current techniques. The broken curve 154, on the other hand, demonstrates the potential enhanced oil production using an embodiment of the three-step method described above. As shown in FIG. 7, the disclosed methods have the ability to increase initial production rates, reduce decline rates, and increase ultimate recovery from a low-permeability subterranean formation. As a non-limiting example, an embodiment of the methods disclosed could be used on the Bakken formation, a large, low-permeability subterranean formation. The Bakken formation comprises oil reserves estimated at 500 billion barrels. Therefore, extracting as much as 1% (estimated at approximately 5 billion barrels of oil) of such reserves would be significant, and the disclosed methods may have the ability to achieve such production.

In another aspect of the disclosure, the three stage method may be performed on a low-permeability formation or reservoir. A low-permeability reservoir, or "tight oil" formation, is one where the oil flow from the reservoir to the surface is restricted due to decreased reservoir pressure and low permeability in the rock formation. A "tight oil" formation is one where the rock has a permeability of less than 50 millidarcies; 100 millidarcies; or 150 millidarcies. Additionally, a formation may qualify as a "tight oil" formation if the well was drilled laterally in order to enhance the oil recovery.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for stimulating a subterranean formation comprising:
    a first injection phase that comprises injecting a first gas-based fluid, compressed in a first compressor, into a subterranean formation at a first pressure that exceeds a fracture pressure of the subterranean formation, wherein the first gas-based fluid comprises at least 65% carbon dioxide ($CO_2$) by weight;
    a second injection phase that comprises injecting a second gas-based fluid compressed in a second compressor, into the subterranean formation at a second pressure that exceeds a minimum miscibility pressure of the second gas-based fluid followed by a shut in period, wherein the second gas-based fluid comprises at least 65% carbon dioxide ($CO_2$) by weight, wherein the second pressure is less than the fracture pressure of the subterranean formation; and a third injection phase that comprises injecting the first gas-based fluid or a third gas-based fluid, compressed in the first compressor, into the subterranean formation at the first pressure exceeding the fracture pressure of the subterranean formation or at a third pressure exceeding the fracture pressure of the subterranean formation, wherein the third gas-based fluid comprises at least 65% carbon dioxide ($CO_2$) by weight.

2. The method of claim 1, wherein the first gas-based fluid, second gas-based fluid, and/or third gas-based fluid also comprises one of the following: nitrogen ($N_2$), carbon monoxide (CO), methane ($CH_4$), hydrogen sulfide ($H_2S$), argon (Ar), helium (He), neon (Ne), krypton (Kr), xenon (Xe), radon (Rn), or any combination thereof.

3. The method of claim 1, wherein the second injection phase is repeated, at least one time, before the third injection phase begins.

4. The method of claim 1, wherein the subterranean formation comprises a permeability of less than 100 millidarcies, and wherein the subterranean formation is drilled into using lateral drilling.

5. The method of claim 1, wherein the fracture pressure of the subterranean well is 3,500 psi or greater.

6. The method of claim 1, wherein the minimum miscibility pressure of the second gas-based fluid is between 1,500 and 2,500 psi.

7. The method of claim 1, wherein the first injection phase, second injection phase, and third injection phase are completed with a surface injection system comprising:
   at least one storage tank for storing at least one of: the first gas-based fluid, the second gas-based fluid, and the third gas-based fluid;
   the first compressor;
   a first turbine;
   a liquid and gas separator;
   a gas separator
   the second compressor; and
   a second turbine.

8. The method of claim 7, comprising a valve and a third compressor, wherein the valve is positioned after the liquid and gas separator, wherein the valve controls whether the gas-based fracturing fluid enters the second compressor or the third compressor, and wherein the third compressor has either more or less capacity than the second compressor.

9. A method for stimulating a subterranean formation comprising:
   a first injection phase, that follows the stimulating of the subterranean formation, wherein the first injection phase comprises two or more cyclical injections of a first gas-based fluid, compressed in a first compressor, into the subterranean formation at a first pressure that exceeds a minimum miscibility pressure of the first gas-based fluid followed by a shut in period, wherein the first gas-based fluid comprises at least 65% carbon dioxide ($CO_2$) by weight; and
   a second injection phase, after a final repetition of the first injection phase, that comprises injecting a second gas-based fluid, compressed in a second compressor, into the subterranean formation at a second pressure exceeding a fracture pressure of the subterranean formation, wherein the second gas-based fluid comprises at least 65% carbon dioxide ($CO_2$) by weight, wherein the second pressure is less than the fracture pressure of the subterranean formation.

10. The method of claim 9, wherein the first gas-based fluid, the second gas-based fluid, and/or a third gas-based fluid, compressed in the first compressor, also comprises one of the following: nitrogen ($N_2$), carbon monoxide (CO), methane ($CH_4$), hydrogen sulfide ($H_2S$), argon (Ar), helium (He), neon (Ne), krypton (Kr), xenon (Xe), radon (Rn), or any combination thereof.

11. The method of claim 9, wherein the first injection phase and second injection phase are repeated, at least one time, after completion of a first repetition of the first injection phase and the second injection phase.

12. The method of claim 9, wherein the fracture pressure of a low permeability subterranean well is 3,500 psi or greater.

13. The method of claim 9, wherein the minimum miscibility pressure of the first gas-based fluid is between 1000 and 3000 psi.

14. The method of claim 9, wherein the first injection phase and second injection phase are completed with a surface injection system comprising:
   at least one storage tank for storing at least one of: the first gas-based fluid, the second gas-based fluid, and the third gas-based fluid;
   the first compressor;
   a first turbine;
   a liquid and gas separator;
   a gas separator;
   the second compressor; and
   a second turbine.

15. The method of claim 14, comprising a valve and a third compressor, wherein the valve is positioned after the liquid and gas separator, wherein the valve controls whether the gas-based fracturing fluid enters the second compressor or the third compressor, and wherein the third compressor has more or less capacity than the second compressor.

16. A method for stimulating a low permeability subterranean formation comprising:
   a first injection phase that comprises injecting a first gas-based fluid, compressed in a first compressor, into a low permeability subterranean formation at a first pressure that exceeds a fracture pressure of the low permeability subterranean formation, wherein a permeability of the low permeability subterranean formation is less than 100 millidarcies, and wherein the first gas-based fluid comprises at least 65% carbon dioxide ($CO_2$) by weight;
   a second injection phase that comprises two or more cyclical injections of a second gas-based fluid, compressed in a second compressor, into the low permeability subterranean formation at a second pressure that exceeds a minimum miscibility pressure of the second gas-based fluid followed by a shut in period, wherein the second gas-based fluid comprises at least 65% carbon dioxide ($CO_2$) by weight, wherein the second pressure is less than the fracture pressure of the subterranean formation; and
   a third injection phase, after a final repetition of the second injection phase, that comprises injecting the first gas-based fluid or a third gas-based fluid, compressed in the first compressor, into the low permeability subterranean formation at the first pressure exceeding the fracture pressure of the low permeability subterranean formation or at a third pressure that exceeds the fracture pressure of the low permeability subterranean formation, wherein the third gas-based fluid comprises at least 65% carbon dioxide ($CO_2$) by weight.

17. The method of claim 16, wherein the low permeability subterranean formation is drilled using lateral drilling.

18. The method of claim 16, wherein the first gas-based fluid, the second gas-based fluid, and/or the third gas-based fluid is recycled back to the surface after injection into the low permeability subterranean formation.

\* \* \* \* \*